(12) United States Patent
Braet et al.

(10) Patent No.: US 10,645,877 B2
(45) Date of Patent: May 12, 2020

(54) DRAPER BELT HEADER WITH PIVOTING WINGS

(71) Applicant: Deere & Company, Moline, IL (US)

(72) Inventors: Andrew J. Braet, Moline, IL (US); Bryan R. Yanke, Eldridge, IA (US); Michael L. Vandeven, Princeton, IA (US); Brian Busath, Salt Lake City, UT (US); Joshua R. Pierson, Davenport, IA (US); Mark Schuler, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 157 days.

(21) Appl. No.: 15/784,983

(22) Filed: Oct. 16, 2017

(65) Prior Publication Data

US 2019/0110403 A1   Apr. 18, 2019

(51) Int. Cl.
```
A01D 61/02      (2006.01)
A01D 41/14      (2006.01)
A01D 61/00      (2006.01)
A01D 34/04      (2006.01)
A01D 67/00      (2006.01)
```
(52) U.S. Cl.
CPC ............ *A01D 61/02* (2013.01); *A01D 34/04* (2013.01); *A01D 41/14* (2013.01); *A01D 61/002* (2013.01); *A01D 67/00* (2013.01)

(58) Field of Classification Search
CPC ........ A01D 61/02; A01D 34/04; A01D 67/00; A01D 41/14; A01D 41/144; A01D 57/06; A01D 57/20; A01D 61/002
See application file for complete search history.

(56) References Cited

U.S. PATENT DOCUMENTS

| | | | |
|---|---|---|---|
| 6,202,397 B1 | 3/2001 | Watts et al. | |
| 7,549,280 B2 | 6/2009 | Lovett et al. | |
| 7,614,206 B2 * | 11/2009 | Tippery | A01D 41/144 56/15.8 |
| 8,087,224 B1 * | 1/2012 | Coers | A01D 41/144 56/153 |

(Continued)

FOREIGN PATENT DOCUMENTS

EP   3398426 A1   11/2018

OTHER PUBLICATIONS

European Patent Office Extended Search Report for Application No. 18200451.5 dated Mar. 19, 2019 (10 pages).

*Primary Examiner* — Robert E Pezzuto
*Assistant Examiner* — Adam J Behrens
(74) *Attorney, Agent, or Firm* — Michael Best & Friedrich LLP (57) ABSTRACT

A header for a combine harvester includes a center section having a first draper belt configured to move crop material in a first direction. The header also includes a wing pivotably coupled to the center section about a pivot axis and extending laterally away from the center section. The header also includes a second draper belt coupled to the wing and configured to move crop material in a second direction different than the first direction. The wing and the second draper belt are in a fixed positional relationship with each other, such that the wing is configured to remain at a constant distance from the second draper belt at all points along the wing during pivoting movement of the wing.

16 Claims, 9 Drawing Sheets

(56) References Cited

U.S. PATENT DOCUMENTS

| | | | |
|---|---|---|---|
| 2002/0129591 A1* | 9/2002 | Patterson | A01D 57/20 56/158 |
| 2007/0204584 A1* | 9/2007 | Coers | A01D 41/14 56/15.8 |
| 2014/0059995 A1* | 3/2014 | Cormier | A01D 43/06 56/181 |
| 2014/0165526 A1* | 6/2014 | Leys | A01D 41/14 56/181 |
| 2018/0206406 A1* | 7/2018 | Joyce | A01D 61/006 |
| 2018/0338425 A1* | 11/2018 | Cook | A01D 57/20 |
| 2019/0000014 A1* | 1/2019 | Farley | A01D 41/14 |

* cited by examiner

DRAPER BELT HEADER WITH PIVOTING WINGS

BACKGROUND

The disclosure relates to combine harvesters, and specifically to headers for combine harvesters.

Combine harvesters commonly include headers that are used to cut and move crop material from a field into a body of the combine harvester, where the crop material is then further processed.

SUMMARY

In accordance with one embodiment, a header for a combine harvester includes a center section having a first draper belt configured to move crop material in a first direction. The header also includes a wing pivotably coupled to the center section about a pivot axis and extending laterally away from the center section. The header also includes a second draper belt coupled to the wing and configured to move crop material in a second direction different than the first direction. The wing and the second draper belt are in a fixed positional relationship with each other, such that the wing is configured to remain at a constant distance from the second draper belt at all points along the wing during pivoting movement of the wing.

In accordance with another embodiment, a header for a combine harvester includes a center section having a first draper belt configured to move crop material in a first direction. The header also includes a wing pivotably coupled to the center section about a pivot axis and extending laterally away from the center section. The header also includes a second draper belt coupled to the wing and configured to move crop material in a second direction different than the first direction. The second draper belt is configured to move concurrently with the wing during pivoting movement of the wing.

In accordance with another embodiment, a header for a combine harvester includes a center section having a first draper belt configured to move crop material in a first direction. The header also includes a wing pivotably coupled to the center section about a pivot axis and extending laterally away from the center section. The header also includes a second draper belt coupled to the wing and configured to move crop material in a second direction different than the first direction. The header further includes a cutterbar coupled to the wing. The cutterbar includes a cutterbar support and reciprocating blades coupled to the cutterbar support. The cutterbar and the second draper belt are in a fixed positional relationship with each other, such that the cutterbar is configured to remain at a constant distance from the second draper belt at all points along the cutterbar during pivoting movement of the wing.

Further aspects are set forth in the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the accompanying drawings.

Figure 1:
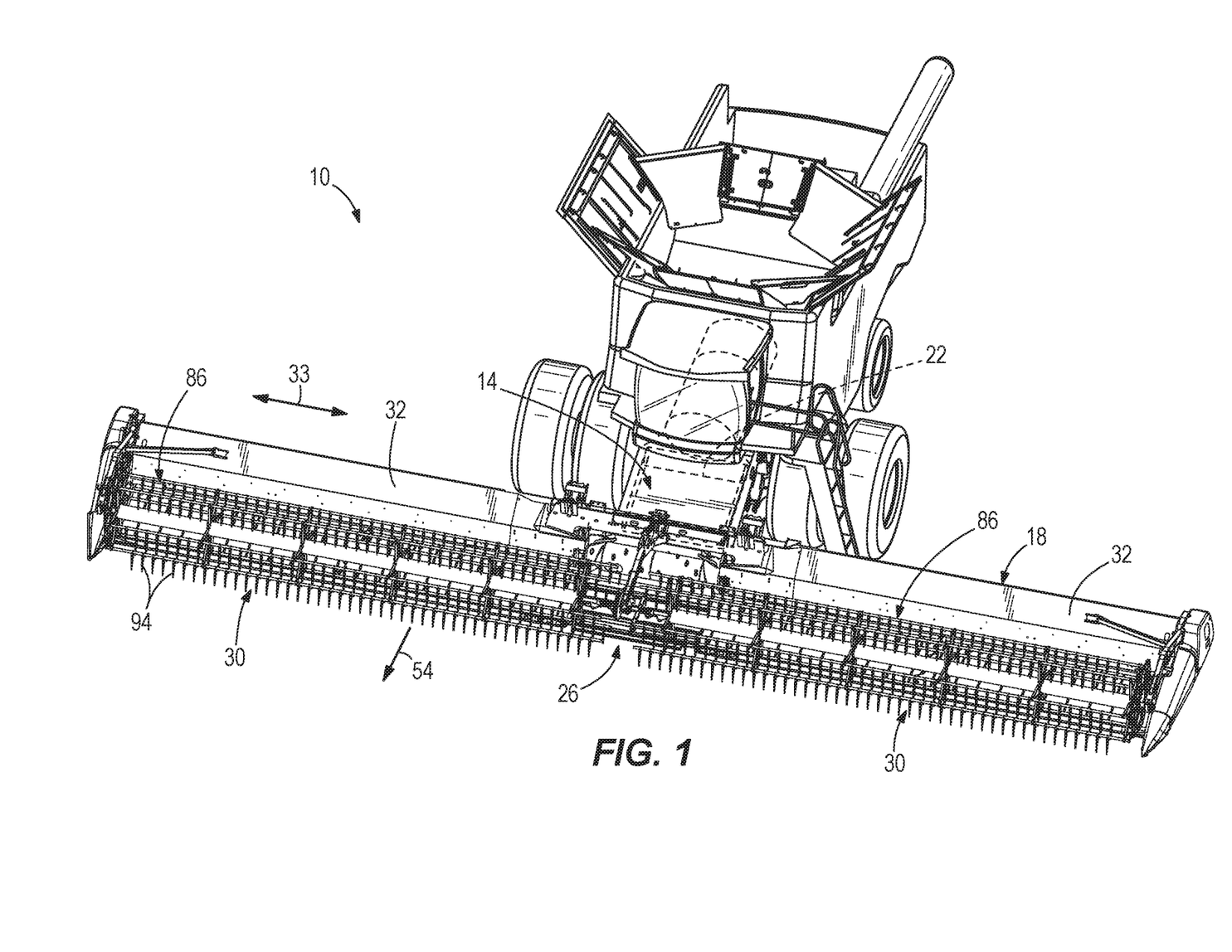
FIG. 1 is a perspective view of a combine harvester in accordance with one embodiment.

Referring to FIG. 1, a combine harvester 10 includes a front end 14 and a removable header 18 located at the front end 14 to cut crop material and feed the crop material into a housing 22 for further harvest processing (e.g., threshing of crop grains from plant stalks and separating or cleaning crop grains from chaffs so that the crop grains alone are harvested).

In the illustrated embodiment, the header 18 includes a center section 26 that couples the header 18 to the housing 22. The header 18 also includes wings 30 (e.g., cutter wings or harvesting wings) that are independently pivotably supported on opposite lateral sides of the center section 26. The wings 30 are identical in size and shape, although in other embodiments one of the wings 30 has a different size and/or shape than the other wing 30. In some embodiments, one or more of the wings 30 is laterally longer than the center section 26 along a lateral direction 33.

Figure 2:
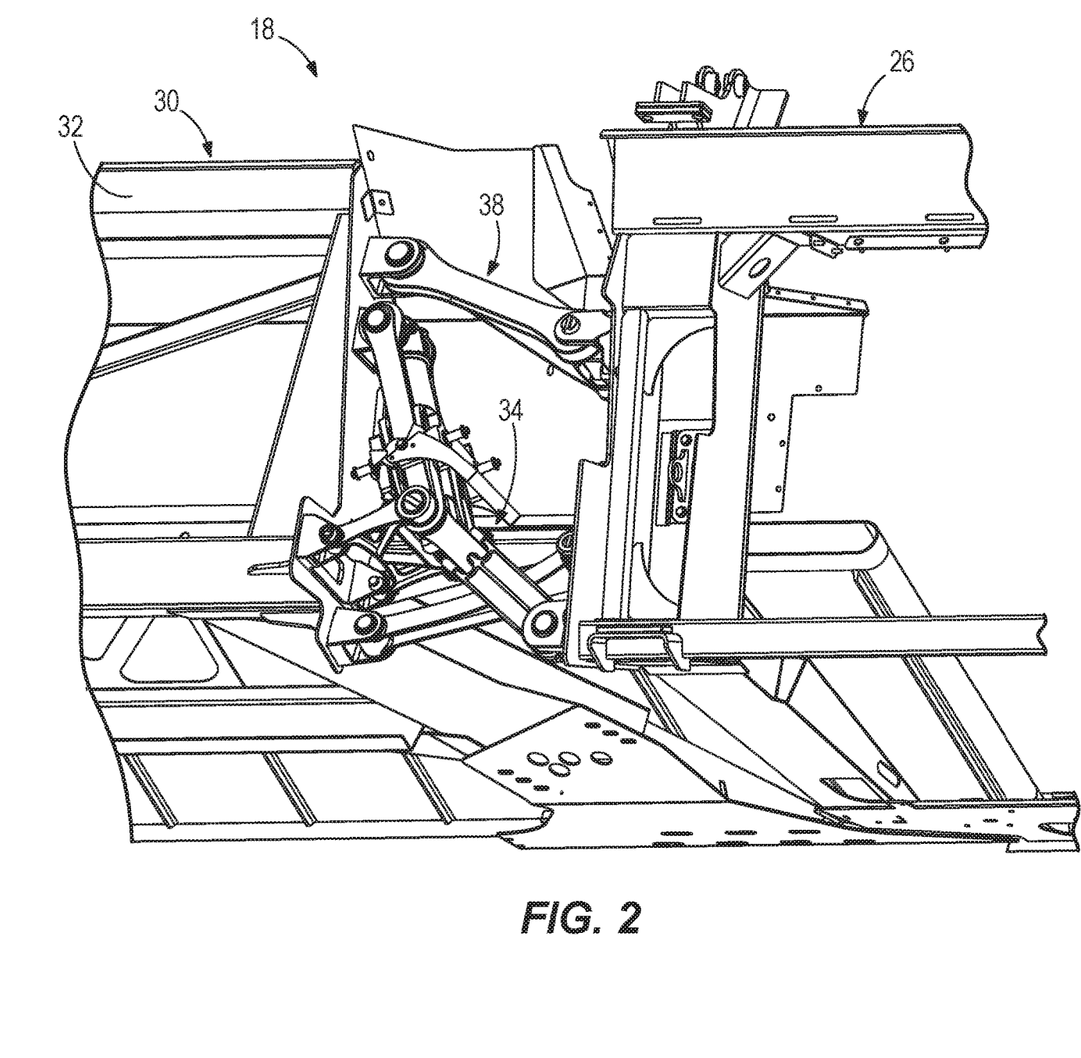
FIG. 2 is a perspective view of an actuator and linkage assembly of the combine harvester of FIG. 1.

The wings 30 are individually pivotable by up to 20 degrees, up to 15 degrees, up to 10 degrees, up to 5 degrees, etc. relative to a ground surface so that the wings 30 may accommodate uneven fields and rows of crops as the crop harvester 10 moves through a field. Other embodiments include different values and ranges. As illustrated in FIG. 2, each wing 30 includes a wing frame 32 and at least one actuator 34 (e.g., hydraulic actuator, pneumatic actuator, or other actuator) and linkage assembly 38 coupled to the actuator 34 and to the wing 30 (e.g., to the wing frame 32). The actuator 34 and linkage assembly 38 link the wing 30 to the center section 26, and generate the pivoting movement of the wing 30 relative to the center section 26. Other embodiments include various other actuators and/or linkage assemblies that generate pivoting movement of the wings 30, as well as different numbers of actuators 34 and linkage assemblies 38, and different locations of actuators 34 and linkage assemblies 38 than that illustrated. In some embodiments, once the wings 30 have been pivoted to desired angles via the actuators 34 and the linkage assemblies 38, the wings 30 may then be rotationally locked (e.g., via pins or other structures) in place at the desired angles. This adjustment permits the wings 30 to be positioned as close to the ground as possible as the crop harvester 10 moves through the field, thereby collecting a greater quantity of crop. In some embodiments, the operator controls the pivoting movement of the wings 30. In other embodiments, a controller may control (e.g., via automatic adjustment) the pivoting movement of the wings 30.

Figure 9:
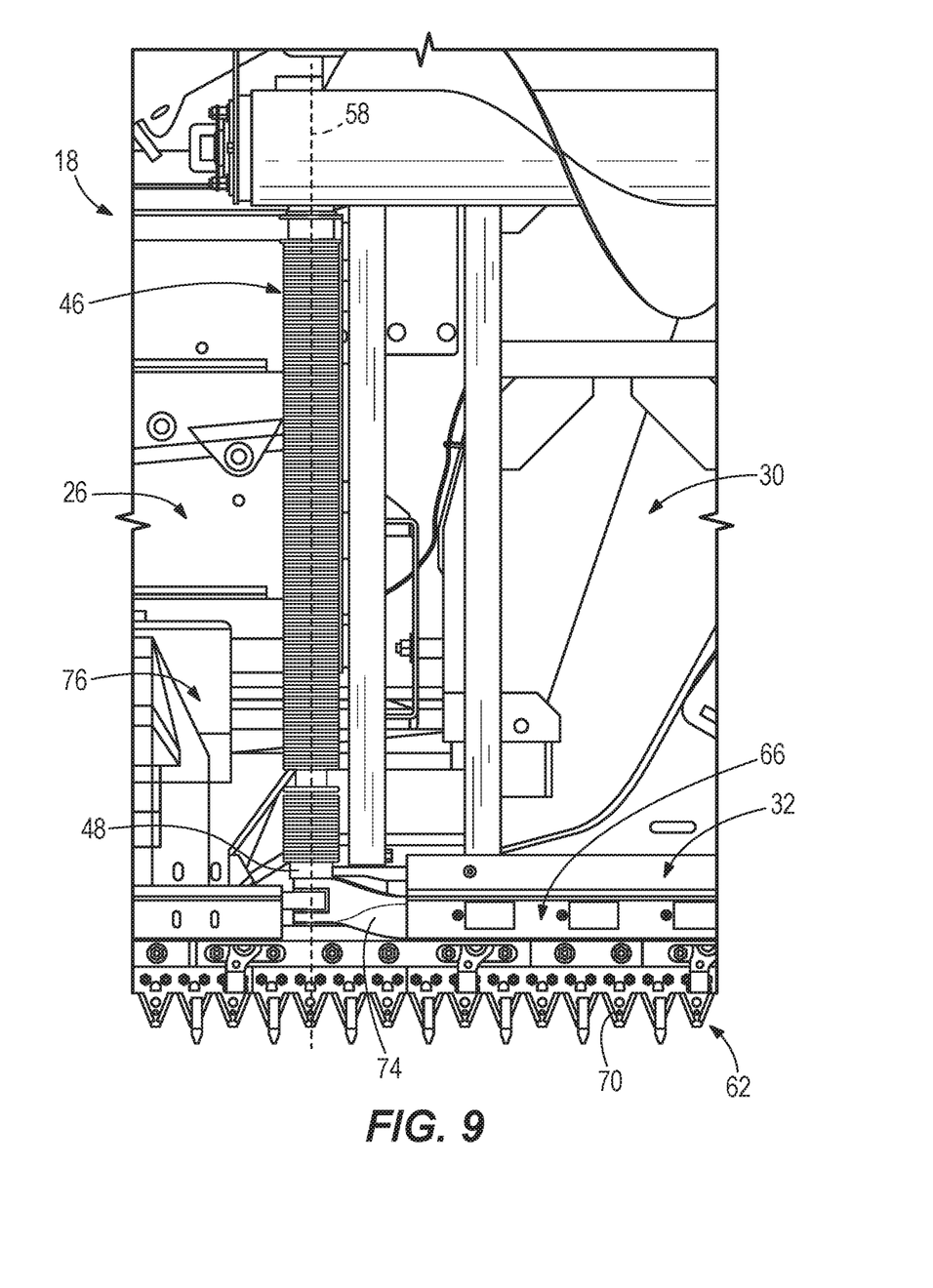
FIGS. 9-11 are top and perspective views of a portion of the header, illustrating a roller for one of the side draper belts, and a cutterbar support.
Figure 10:
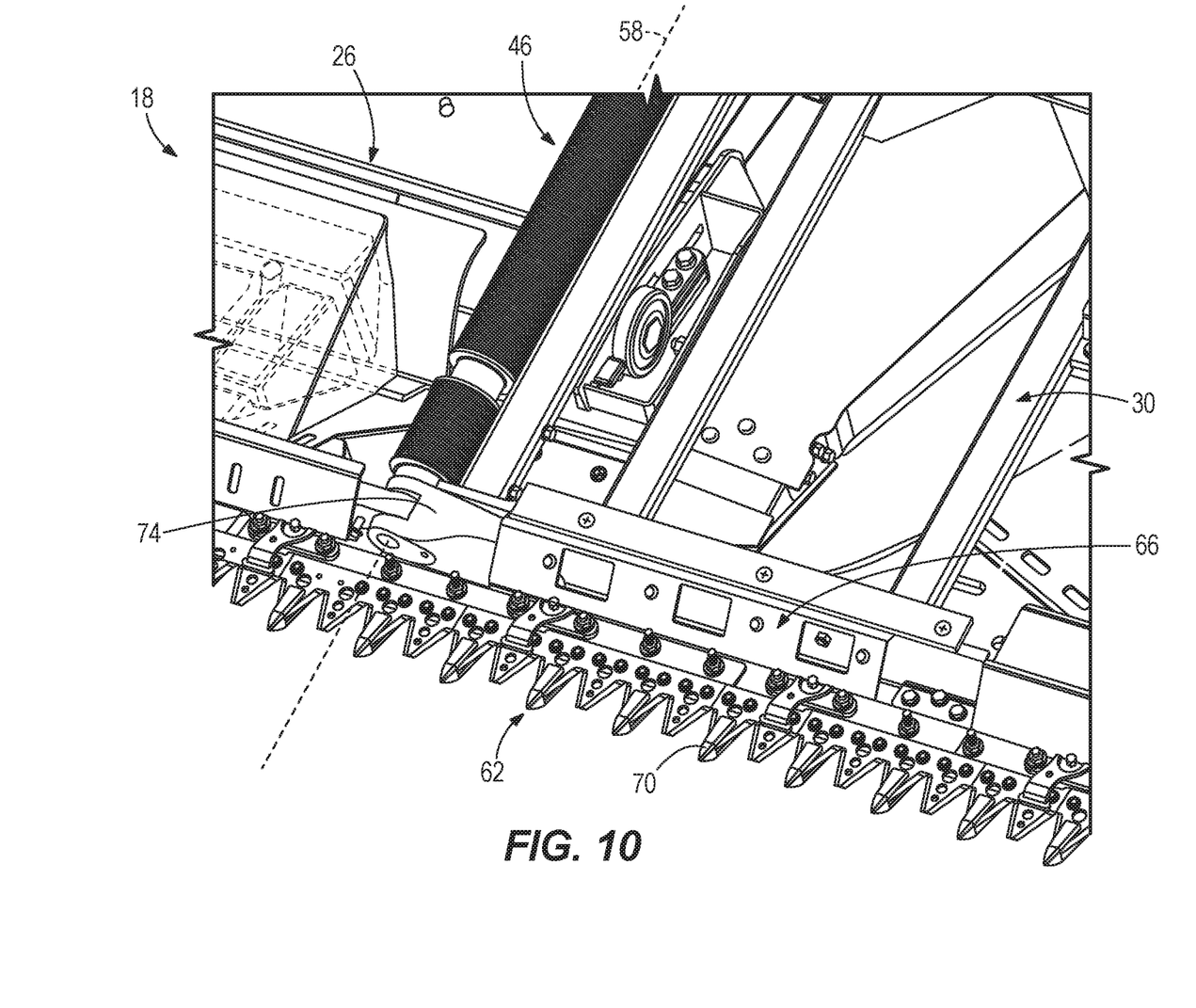
Figure 11:
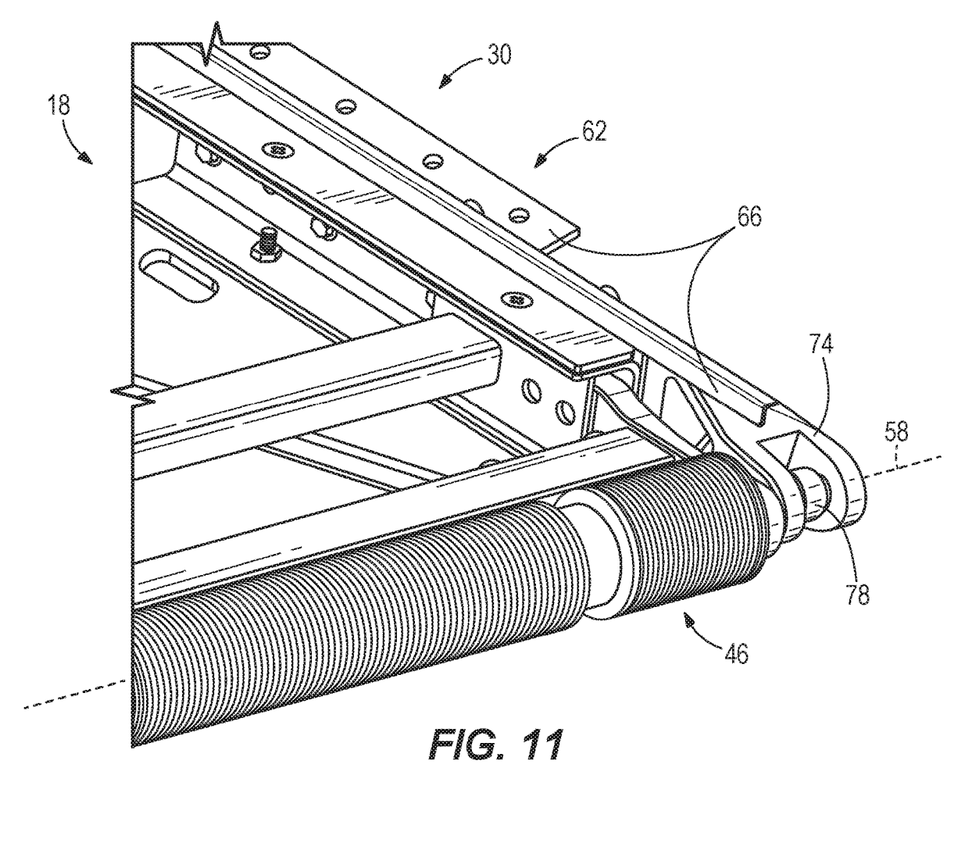

With reference to FIGS. 3-8, the header 18 further includes belts (e.g., solid, flexible, elastomeric belts) to feed the cut crop material into the housing 22. For example, in the illustrated embodiment each wing 30 includes a single side draper belt 42 coupled thereto, the side draper belt 42 extending substantially or entirely along a lateral length of the wing 30. The single side draper belt 42 is operable to transmit the cut crop material laterally inwardly toward the center section 26. The single side draper belts 42 are endless belts moved and/or guided via rollers 46 at laterally inward ends of the side draper belts 42, as well as by additional rollers 47 at opposite ends of the side draper belts 42. In some embodiments, one or more actuators (e.g., drive gears, etc.) drive the side draper belts 42 about the rollers 46 and/or drive rotation of the rollers 46 themselves. As illustrated in FIGS. 9-11, in some embodiments the rollers 46 are located generally adjacent opposite lateral sides of the center section 26, and are supported by roller supports 48 (FIG. 9).

Figure 7:
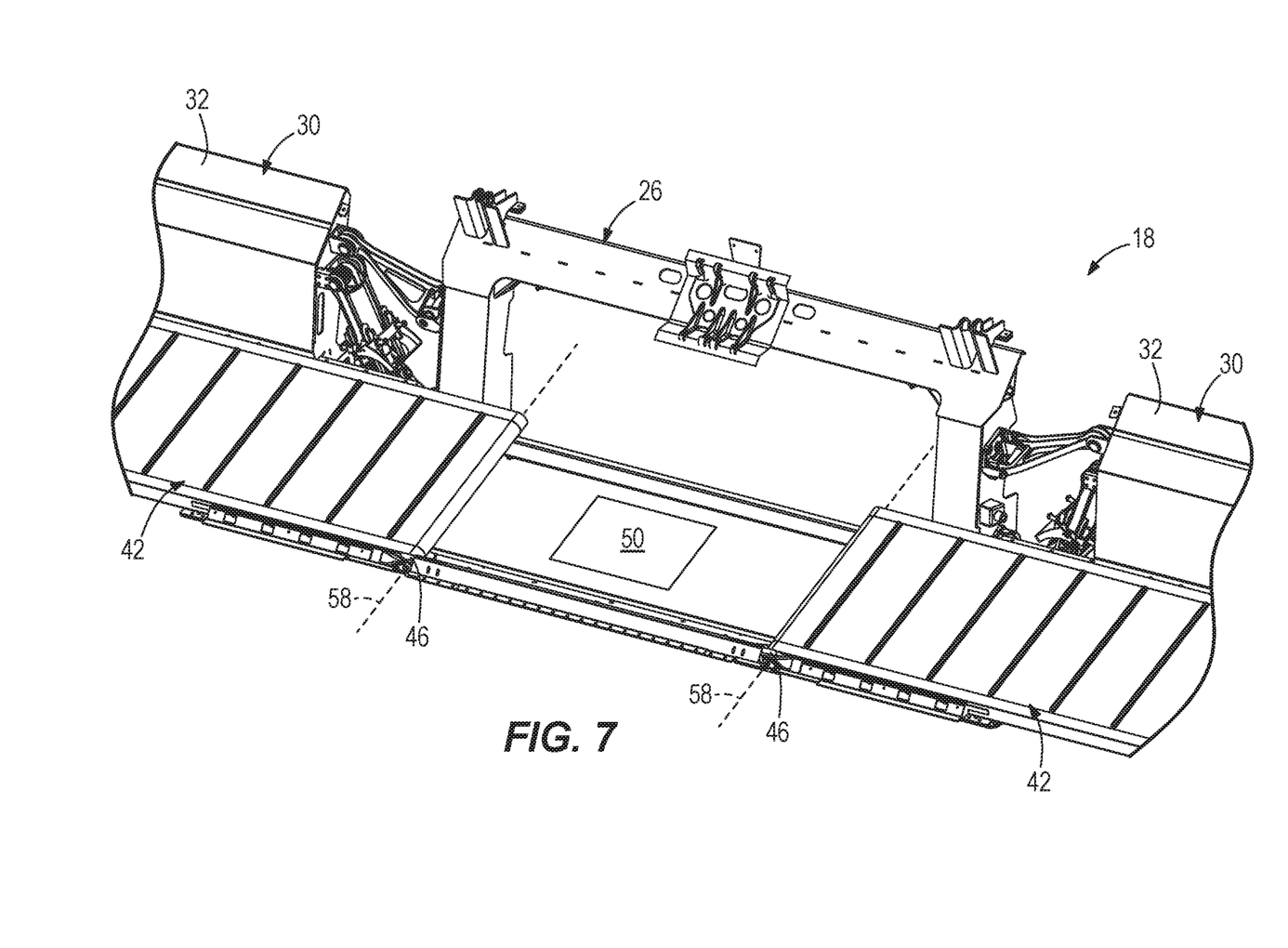
FIG. 7 is a perspective view of a portion of the header, illustrating wings and side draper belts in a first configuration.
Figure 8:
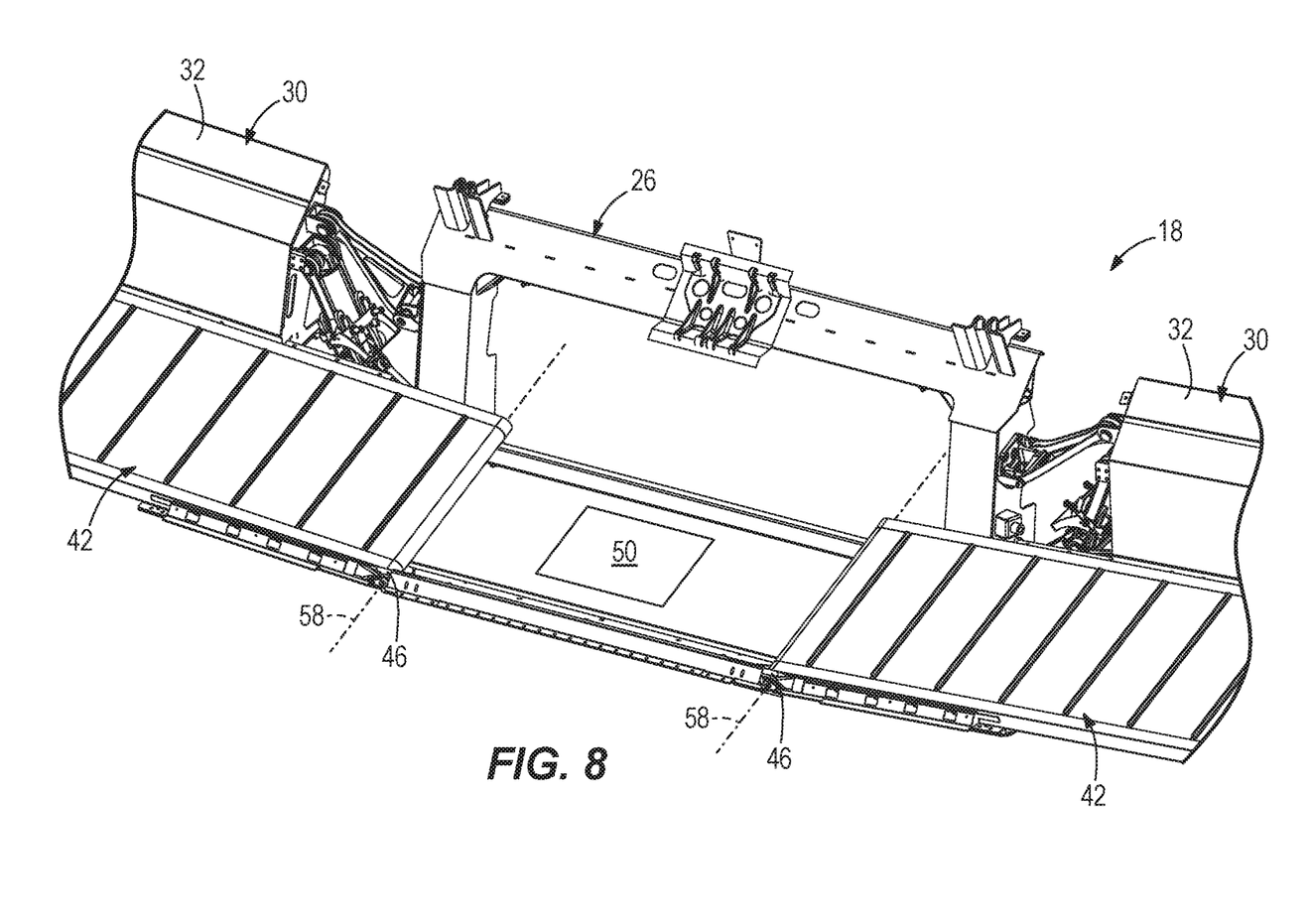
FIG. 8 is a perspective view of the portion of the header, illustrating the wings and the side draper belts in a second configuration.

With reference to FIGS. 7 and 8, in some embodiments the center section 26 further includes an additional draper belt 50 (illustrated schematically) operable to transmit the cut crop material in a direction perpendicular to the side draper belts 42 (i.e., toward the housing 22 illustrated in FIG. 1) and opposite to a direction of travel 54 (FIG. 1) of the combine harvester 10. The additional draper belt 50 is also an endless belt that rotates about rollers (not illustrated). The side draper belts 42 on the wings 30 work together to initially transmit the cut crop material laterally inwardly toward the center section 26, and the additional draper belt 50 works to receive the cut crop material from the side draper belts 42 and to transmit the cut crop material into the housing 22. Other embodiments include different numbers, arrangements, and types of draper belts 42, 50 than that illustrated.

With reference to FIGS. 3-11, the wings 30 pivot about pivot axes 58. The pivot axes 58 extend directly through the rollers 46 and roller supports 48, and are coincident with longitudinal axes of the rollers 46, such that the entire wings 30 and their entire associated side draper belts 42 pivot together about the pivot axes 58. In the illustrated embodiment, the wings 30 do not have any additional pivoting or flexing components (i.e., the entire wings 30 pivot only about the pivot axes 58), and the single side draper belts 42 on each wing 30 are the only draper belts on the wings 30. Thus, during operation, each side draper belt 42 remains at a constant distance or position relative to its respective wing 30 at all times during operation, and remains in a constant configuration or profile (e.g., circulating oval profile) at all times during operation. More specifically, the rollers 46, 47 of each draper belt 42 remain at a constant distance, position, and orientation with respect to each other during operation. The draper belts 42 also maintain a constant belt length through movement of the associated wing 30.

With reference to FIGS. 9-11, the header 18 further includes cutterbars 62 associated with the wings 30 that each include a cutterbar support 66, and a plurality of laterally reciprocating, overlapping blades 70 coupled to the cutterbar support 66. The blades 70 cut through crops and generate the crop material described above. Other embodiments include different numbers and arrangements of cutterbar supports 66 and blades 70 than that illustrated. As illustrated in FIGS. 9-11, each cutterbar support 66 includes a first, pivot end 74 (e.g., sleeve) that is pivotally coupled to a bearing 78 (FIG. 11) extending axially from one of the rollers 46, and a second end (not shown) that is fixed to a laterally outer end 82 (FIGS. 2-6) of one of the wings 30. The pivot axes 58 extend through the bearings 78 such that the entire cutterbars 62 are pivotable about the same pivot axes 58 as the wings 30. As illustrated in FIG. 9, in some embodiments a portion of the blades 70 may extend laterally inwardly from the pivot end 74 of the cutterbar support 66 and alongside a main frame 76 of the center section 26.

With continued reference to FIGS. 9-11, the wings 30 maintain fixed positional relationships with the side draper belts 42 during pivoting movement of the wings 30 (e.g., remain at a constant distance from the side draper belts 42 at all points along the wings 30, resulting in uniform and concurrent movement of both the wings 30 and the side draper belts 42, and in some embodiments resulting in the wings 30 and the side draper belts 42 acting as single uniform body that pivots about the pivot axis 58). The cutterbars 62 also maintain fixed positional relationships with the wings 30 during pivoting movement of the wings 30 (e.g., remain at a constant distance from the wings 30 at all points along the cutterbars 62, resulting in uniform and concurrent movement of both the wings 30 and the cutterbars 62, and in some embodiments resulting in the wings 30 and the cutterbars 62 acting as single uniform body that pivots about the pivot axis 58). The cutterbars 62 also maintain fixed positional relationships with the single side draper belts 42 during pivoting movement of the wings 30 (e.g., remain at a constant distance from the side draper belts 42 at all points along the cutterbars 62, resulting in uniform and concurrent movement of both the side draper belts 42 and the cutterbars 62, and in some embodiments resulting in the side draper belts 42 and the cutterbars 62 acting as single uniform body that pivots about the pivot axis 58). These fixed positional relationships permit crop material to continuously flow from the blades 70 onto the side draper belts 42 regardless of a rotational position of the wings 30.

With reference to FIGS. 1 and 3-6, in the illustrated embodiment the header 18 also includes at least one rotating reel 86 that engages standing crops as the combine harvester 10 moves forward through a field. The reels 86 include center arms 90 (FIGS. 3-6) and teeth 94 (FIG. 1, the teeth 94 not shown in FIGS. 3-6) disposed about the center arms 90 that engage and pull the crops toward the cutterbars 62 and the side draper belts 42. The teeth 94 may be rods, hooks, or any other suitable structures. In some embodiments, the center arms 90 are telescoping structures (e.g., telescoping tubes) to permit the center arms 90 to extend and retract in length (e.g., as illustrated in FIGS. 3-6). In some embodiments, portions of the center arms 90 and/or teeth 94 are driven rotationally via an actuator (e.g., a hydraulic actuator).

As illustrated in FIGS. 3-6, the center arms 90 are coupled to the wings 30 at brackets 98 at the laterally outer ends 82 of the wings 30, the brackets 98 being coupled to first pivoting support arms 100. The wings 30 are also coupled to second pivoting support arms 102 on the center section 26. The pivoting support arms 100, 102 permit the reels 86 to be moved generally toward and away from the side draper belts 42, respectively, depending on whether use of the reels 86 is desired or whether access to the side draper belts 42 (or cutterbars 62) is desired. In some embodiments, the pivoting support arms 100, 102 are moved via one or more actuators (e.g., hydraulic actuators, pneumatic actuators, etc.).

When the reels 86 have been moved toward the side draper belts 42 and are adjacent the side draper belts 42, the reels 86 maintain fixed positional relationships with the side draper belts 42 during pivoting movement of the wings 30 (e.g., remain at a constant distance from the side draper belts 42 at all points along the reels 86, resulting in uniform and concurrent movement of both the side draper belts 42 and the reels 86, and in some embodiments resulting in the side draper belts 42 and the reels 86 acting as single uniform bodies that pivot about the pivot axes 58).

Figure 3:
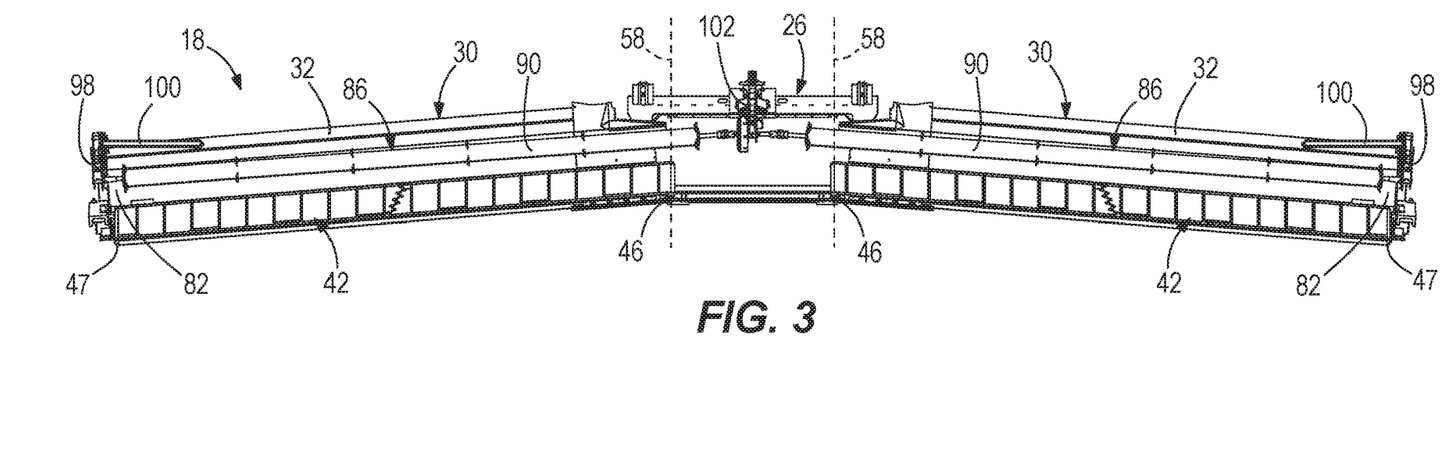
FIG. 3 is a front view of a header of the combine harvester of FIG. 1 in a first configuration.
Figure 4:
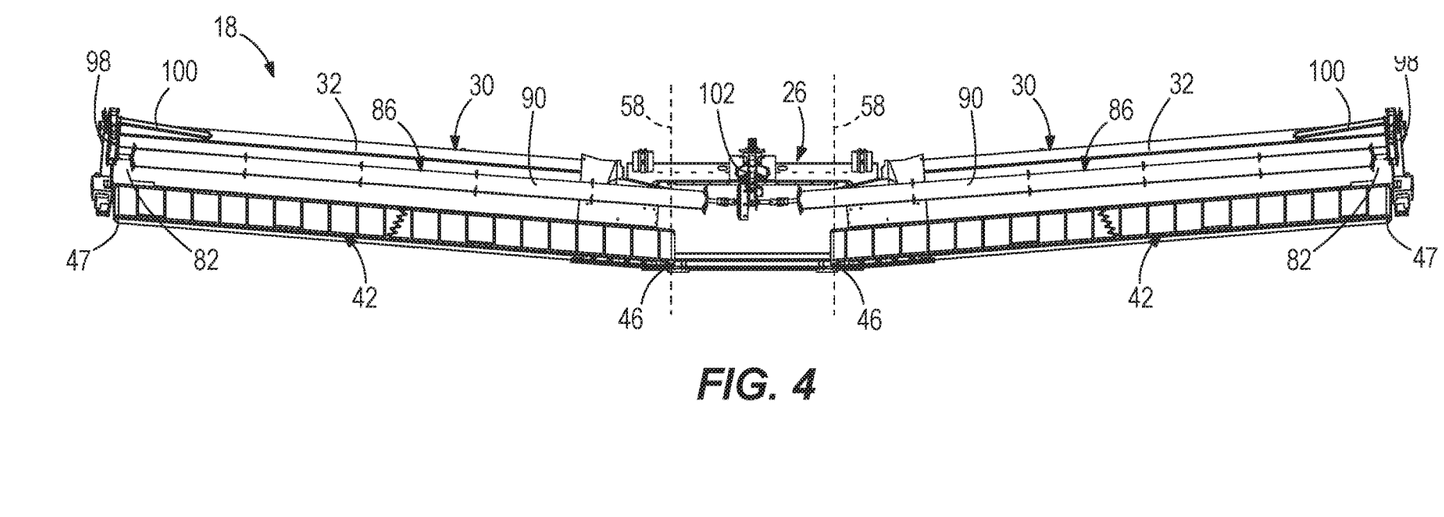
FIG. 4 is a front view of the header in a second configuration.

With reference to FIGS. 1-6, during operation the combine harvester 10 moves through a field. Prior to or during movement through the field, the operator (or controller) actuates the actuators 34, which move the linkage assemblies 38 to generate pivoting movement of the wings 30 until the wings 30 are angled at desired angles relative to the ground surface. As illustrated in FIGS. 3 and 4, when one of the wings 30 is pivoted, the side draper belt 42 moves uniformly with the wing 30 (as does the cutterbar 62). Thus, the wing 30, the side draper belt 42, and the cutterbar 62 all rotate together about the pivot axis 58. As illustrated in FIGS. 3 and 4, the reel 86 also moves with the wing 30, such that a distance between the reel 86 and the side draper belt 42 remains constant. This uniform movement of the wing 30, the side draper belt 42, the cutterbar 62, and the reel 86 helps to maintain consistent crop movement onto the side draper belt 42, and inhibits loss of crop material that is moving toward the side draper belt 42.

Figure 5:
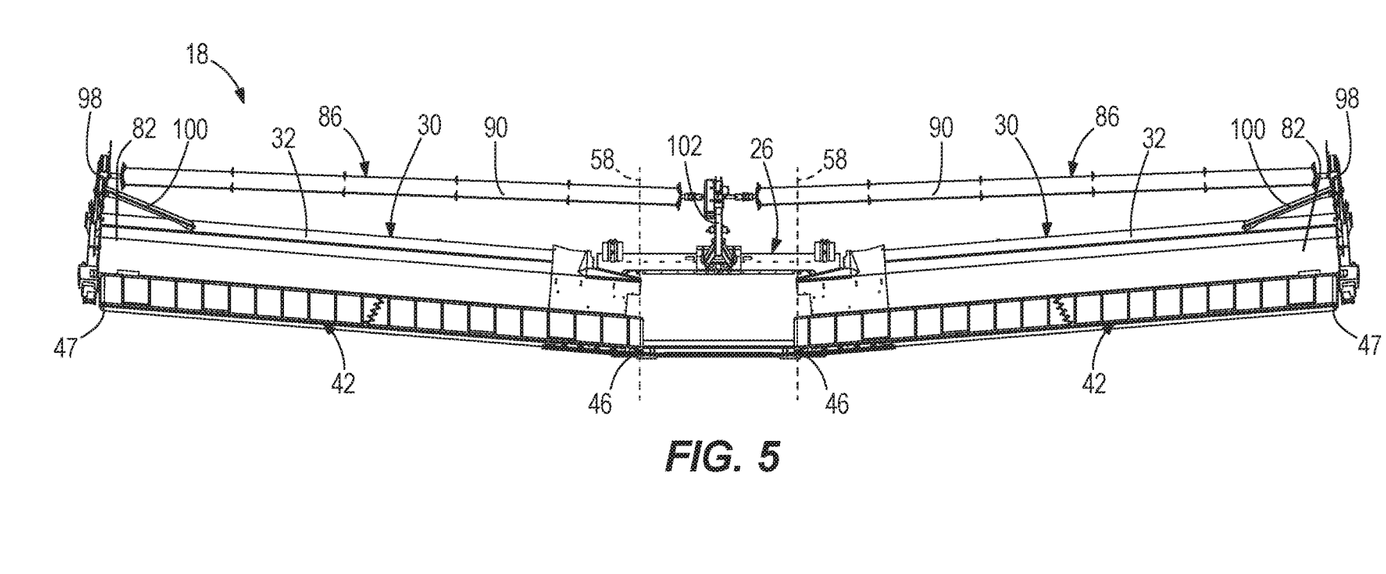
FIG. 5 is a front view of the header in a third configuration.
Figure 6:
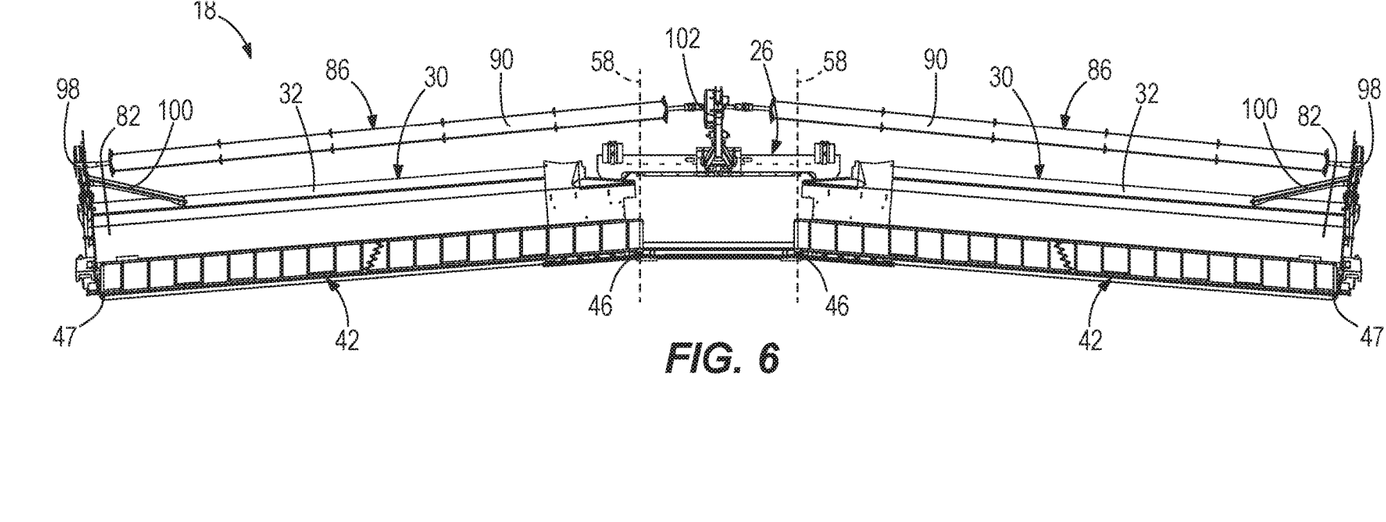
FIG. 6 is a front view of the header in a fourth configuration.

With reference to FIGS. 5 and 6, and as described above, when the operator desires to access the side draper belts 42 (or cutterbars 62), or otherwise desired to move the reels 86 away from the side draper belts 42, the reels 86 are raised via the pivoting support arms 100, 102. When the operator is ready to again utilize the reels 86, the operator then lowers the reels 86 back to the positions illustrated in FIGS. 3 and 4.

Various features and advantages are set forth in the following claims.

What is claimed is:

1. A header for a combine harvester, the header comprising:
   a center section having a first draper belt configured to move crop material in a first direction;
   a wing pivotably coupled to the center section about a pivot axis and extending laterally away from the center section; and
   a second draper belt coupled to the wing and configured to move crop material in a second direction different than the first direction,
   wherein the wing and the second draper belt are in a fixed positional relationship with each other, such that the wing is configured to remain at a constant distance from the second draper belt at all points along the wing during pivoting movement of the wing, and
   wherein the wing includes a roller, wherein the second draper belt is configured to rotate about the roller, and wherein the pivot axis is coincident with a longitudinal axis of the roller.

2. The header of claim 1, wherein the second draper belt is the only draper belt coupled to the wing.

3. The header of claim 1, further comprising a cutterbar coupled to the wing, wherein the cutterbar includes a cutterbar support and reciprocating blades coupled to the cutterbar support, wherein the cutterbar and the second draper belt are in a fixed positional relationship with each other, such that the cutterbar is configured to remain at a constant distance from the second draper belt at all points along the cutterbar during pivoting movement of the wing.

4. The header of claim 3, wherein the wing includes a roller, wherein the second draper belt is configured to rotate about the roller, wherein a bearing extends axially from the roller, and wherein the cutterbar support includes a sleeve coupled to the bearing.

5. The header of claim 1, wherein the first direction is perpendicular to the second direction.

6. The header of claim 1, wherein the wing is a first wing and the axis is a first axis, wherein the header further includes a second wing pivotably coupled to the center section about a second axis, and a third draper belt coupled to the second wing.

7. The header of claim 6, wherein the second wing and the third draper belt are in a fixed positional relationship with each other, such that the second wing is configured to remain at a constant distance from the third draper belt at all points along the second wing during pivoting movement of the second wing.

8. The header of claim 6, wherein the third draper belt is the only draper belt coupled to the second wing.

9. A header for a combine harvester, the header comprising:
   a center section having a first draper belt configured to move crop material in a first direction;
   a wing pivotably coupled to the center section about a pivot axis and extending laterally away from the center section; and
   a second draper belt coupled to the wing and configured to move crop material in a second direction different than the first direction,
   wherein the second draper belt is configured to move concurrently with the wing during pivoting movement of the wing, and
   wherein the wing includes a roller, wherein the second draper belt is configured to rotate about the roller, and wherein the pivot axis is coincident with a longitudinal axis of the roller.

10. The header of claim 9, wherein the second draper belt is the only draper belt coupled to the wing.

11. The header of claim 9, further comprising a cutterbar coupled to the wing, wherein the cutterbar includes a cutterbar support and reciprocating blades coupled to the cutterbar support, wherein the cutterbar and the second draper belt are in a fixed positional relationship with each other, such that the cutterbar is configured to remain at a constant distance from the second draper belt at all points along the cutterbar during pivoting movement of the wing.

12. The header of claim 11, wherein the wing includes a roller, wherein the second draper belt is configured to rotate about the roller, wherein a bearing extends axially from the roller, and wherein the cutterbar support includes a sleeve coupled to the bearing.

13. The header of claim 9, wherein the first direction is perpendicular to the second direction.

14. The header of claim 9, wherein the wing is a first wing and the axis is a first axis, wherein the header further includes a second wing pivotably coupled to the center section about a second axis, and a third draper belt coupled to the second wing.

15. The header of claim 14, wherein the second wing and the third draper belt are in a fixed positional relationship with each other, such that the second wing is configured to remain at a constant distance from the third draper belt at all points along the second wing during pivoting movement of the second wing.

16. The header of claim 14, wherein the third draper belt is the only draper belt coupled to the second wing.

* * * * *